United States Patent [19]

Deem

[11] 4,131,318
[45] Dec. 26, 1978

[54] VACUUM COIN COLLECTION APPARATUS

[76] Inventor: Curtis Deem, c/o Sherman Industries, Inc., 600 W. Broad St., Palmyra, N.J. 08065

[21] Appl. No.: 841,077

[22] Filed: Oct. 11, 1977

[51] Int. Cl.² ............................................. B65G 51/02
[52] U.S. Cl. .................................... 302/2 R; 232/1 R; 302/59
[58] Field of Search ........................ 302/1, 2 R, 17, 27, 302/42, 59; 243/1, 4, 23, 38, 2, 3; 194/1 R, 1 A, 1 B, 1 F, 2, DIG. 18; 232/1 R, 43.1, 43.2

[56] References Cited

U.S. PATENT DOCUMENTS

| | | | |
|---|---|---|---|
| 2,003,257 | 5/1935 | Fageol et al. | 243/3 |
| 3,419,209 | 12/1968 | Munn | 232/1 R |
| 3,509,911 | 5/1970 | Carsey | 302/27 X |

Primary Examiner—Evon C. Blunk
Assistant Examiner—James L. Rowland
Attorney, Agent, or Firm—Seidel, Gonda & Goldhammer

[57] ABSTRACT

A coin collection apparatus includes a collection chamber and a vacuum mechanism for applying a vacuum to the collection chamber. A plurality of inlet holes are formed through a top wall of the chamber and a conduit connects each of the inlet holes to a separate and discrete source of coins. A discrete stopper is located at each inlet hole and is biased to a blocking position for individually blocking each of the inlet holes. A solenoid is connected to each of the stoppers for moving the stopper against the bias force to allow communication between the conduit and the collection chamber. Timing mechanisms periodically activate the vacuum mechanism and the solenoids.

15 Claims, 4 Drawing Figures

VACUUM COIN COLLECTION APPARATUS

BACKGROUND OF THE INVENTION

Broadly speaking, the present invention is concerned with the pneumatic conveying of articles. U.S. Pat. Nos. 3,195,959; 3,419,209; 3,759,577 and 3,813,127 each disclose an article conveying system wherein articles are collected from a plurality of stations and pneumatically transported to a common collection point.

More particularly, the present invention is concerned with the collection of coins from a plurality of car washing bays by means of a pneumatic conveying system. U.S. Pat. No. 1,945,835 discloses a coin collection system for use in mass transit transport vehicles. The coins, which are collected by the apparatus of U.S. Pat. No. 1,945,835, are transferred from a plurality of collection stations to a common receiving station by means of a pneumatic impacting mechanism located at each collection station. U.S. Pat. No. 3,979,054 discloses a coin collecting system for use in car washing installations.

SUMMARY OF THE INVENTION

The coin collection apparatus of the present invention is comprised of a collection chamber and a vacuum means for applying a vacuum to the chamber. A plurality of inlets lead to the chamber and each inlet is adapted to communicate with a separate and discrete source of coins. A blocking means blocks each of the inlets and a moving means is provided to move said blocking means from a blocking position to an open position. A vault communicates with the collection chamber and receives coins therefrom.

In the preferred embodiment, the inlets are formed as holes through the top wall of the collection chamber and a discrete stopper is used as the blocking means for blocking communication through each of the holes. Each stopper is carried by a movable rod which is moved by means of a solenoid.

A pair of timing mechanisms control the activation of the vacuum means and the solenoids to thereby control the collection of coins from the separate and discrete sources of coins. In the preferred embodiment, the separate and discrete sources of coins are a plurality of individual car washing bays in a self-service car washing installation. The first timing mechanism can be programmed to be periodically activated at intervals over a twenty-four hour span. The first timing mechanism periodically activates the second timing mechanism. The second timing mechanism is preferably a motor driven five minute timer with the capability of activating and deactivating ten circuits. The circuits are activated and deactivated by cam actuated mechanical relays. The second timing mechanism activates the vacuum means over substantially the five minute time period and periodically activates the solenoid valves in such a manner that only one solenoid valve at a time is activated. A vacuum is thus applied to only one of the inlet holes at a time.

The vault is disposed below the collection chamber and a discharge chute connects the vault to the collection chamber. The vault may be encased in a concrete block above ground or may be buried underground.

It is an object of the present invention to periodically collect coins from a plurality of discrete sources and transfer the coins to a protected vault.

It is another object of the invention to automatically collect coins from a plurality of coin meters and transfer the coins to a secure collection point.

It is another object of the invention to discourage tampering and theft of coins from coin meters of self-service car wash installations.

Other objects will appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
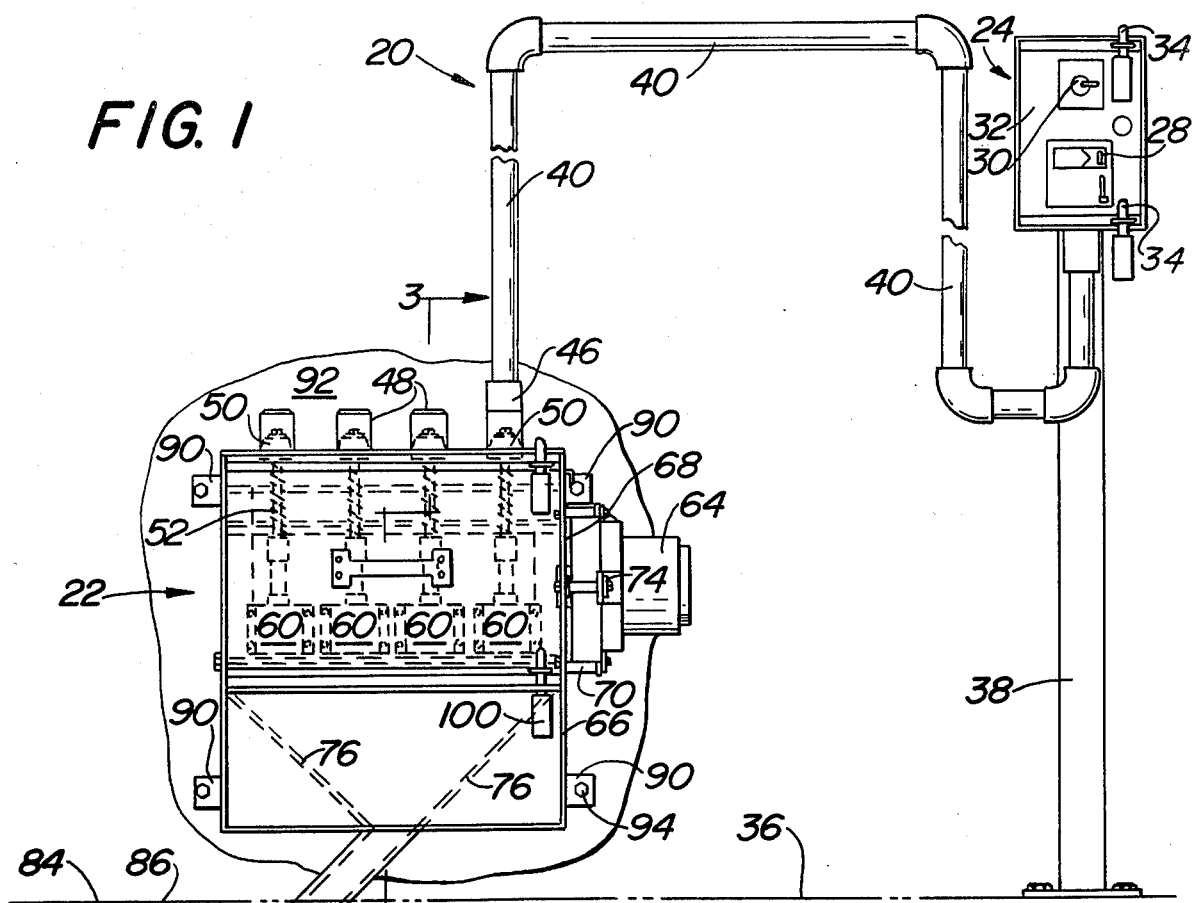
FIG. 1 is an elevational view of the coin collection apparatus of the present invention with portions broken away for clarity and illustrating a coin collection chamber connected to a coin meter.

Referring to the drawings in detail, wherein like numerals indicate like elements, there is shown in FIG. 1 a coin collection system in accordance with the present invention designated generally as 20. The coin collection system 20 is comprised of a collection chamber 22 which collects articles, such as coins, from a plurality of separate collection points, such as coin meters 24. Once the collection chamber 22 has collected the coins from the coin meters 24, the coins are transferred to a vault 26.

The coin meters 24 (one of which is shown in FIG. 1) are each located at an individual car washing bay of a self-service car washing installation. The specific details of the coin meter 24 and the car washing bay are conventional and, hence, will be described only briefly herein. Each coin meter 24 has a coin deposit slot 28 and a selection dial 30. A user of the self-service car washing bay would select the desired type of washing cycle with dial 30 and insert an appropriate amount of coins in the slot 28 to activate the washing cycle. The front face 32 of each coin meter 24 is either pivotable or removable away from the remainder of the coin meter 24. The front face 32 is secured to the remainder of the coin meter 24 by a pair of security locks 34. After removing the security locks 34, the front face 32 can be moved. In this manner, access to the interior of the coin meter 24 is attained from routine maintenance or repair.

The coin meter 24 is supported on a surface 36 by a post 38. A conduit 40 connects and provides communication between the collection chamber 22 and each of the coin meters 24. The conduits 40 may be of any suitable piping or tubing. 1¼ inch PVC piping has been found to be especially suitable. A top wall 42 of the collection chamber 22 has a plurality of holes 44 extending therethrough. The drawings illustrate collection chamber 22 with four holes 44 extending therethrough. Additional holes 44 are utilized when more than four coin meters 24 are to be connected to the collection chamber 22. The conduits 40 are connected to the openings 44 by coupling members 46. A cylindrical member 48 extends outward from each of the holes 44. The coupling member 46 is fixedly secured to the outer surface of a cylindrical member 48 and a conduit 40 to be coupled thereto.

A stopper 50 blocks each hole 44 to thereby prevent communication between a conduit 40 and the interior of the collection chamber 22. Each stopper 50 is attached to a movable rod 52 and is movable with the rod 52 to and from its blocking position. An abutment plate 54 extends inwardly from the inner surface of a side wall 56. Each rod 52 extends on either side of the abutment plate 54 through a hole therethrough. A helical compression spring 58 is received about each rod 52. One end of the spring 58 abuts the bottom surface of a stopper 50 and the other end of the spring 58 contacts the top surface of the abutment plate 54. The spring 58 is of such a length that it provides a force to bias the stopper upwardly to its blocking position. A separate solenoid 60 is coupled to each of the rods 52. When a solenoid 60 is activated, it pulls the rod 52 and the stopper 50 downwardly against the bias of spring 58. A deflection plate 62 is attached to the inner surface of side wall 56. The deflection plate 62 is disposed above both the solenoids 60 and the abutment plate 54. Each of the rods 52 and a spring 58 received around it extend through a discrete hole in the deflection plate 62. Both the abutment plate 54 and the deflection plate 62 extend along substantially the entire length of the side wall 56. The deflection plate 62 also extends inwardly from the side wall 56 further than the solenoids 60 extend therefrom. The deflection plate 62 thus protects the solenoids 60 from damage by coins falling into the collection chamber 22 through the holes 44.

A vacuum motor 64 is attached to the outer surface of a side wall 66. A gasket 68 is interposed between the outer surface of side wall 66 and the vacuum motor 64. A screen 63 is placed in front of the opening 65 of the vacuum motor 64 to protect the interior of the vacuum motor 64. A plurality of hollow cylindrical spacers 70 are interposed between the outer surface of the wall 66 and flanges 72 of the vacuum motor 64. A bolt is passed through a hole in each flange 72, through a spacer 70 and through an aligned hole in the wall 66. Nuts 74 are thereafter tightened onto either end of each bolt to thereby secure the vacuum motor 64 to the side wall 66.

A plurality of downwardly sloping bottom walls 76 form the interior bottom of the collection chamber 22. The bottom walls 76 converge to a discharge opening 78. A discharge conduit 80 connects the discharge opening 78 with an opening 82 into vault 26. As shown in FIG. 1, the vault 26 is buried below the supporting surface or ground 36. Alternatively, the vault 26 may be supported above the ground but surrounded by a concrete block for additional security. The top of the vault 26 is covered by a hatch or lid 84. Below the lid 84, a combination lock vault door 86 seals the vault 26. Within the vault 26, a removable pouch 88 receives the coins from the discharge conduit 80. The pouch 88 facilitates the removal of coins from the vault 26.

Figure 2:
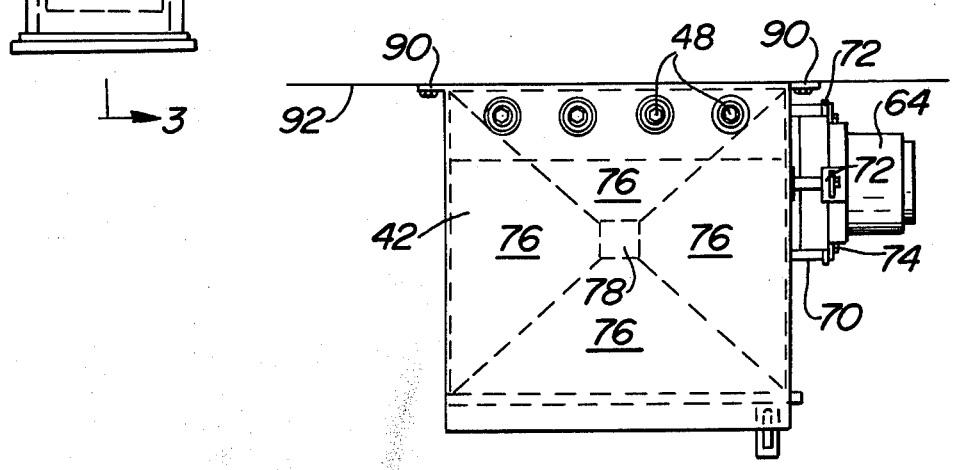
FIG. 2 is a top plan view of the coin collection chamber.
Figure 3:
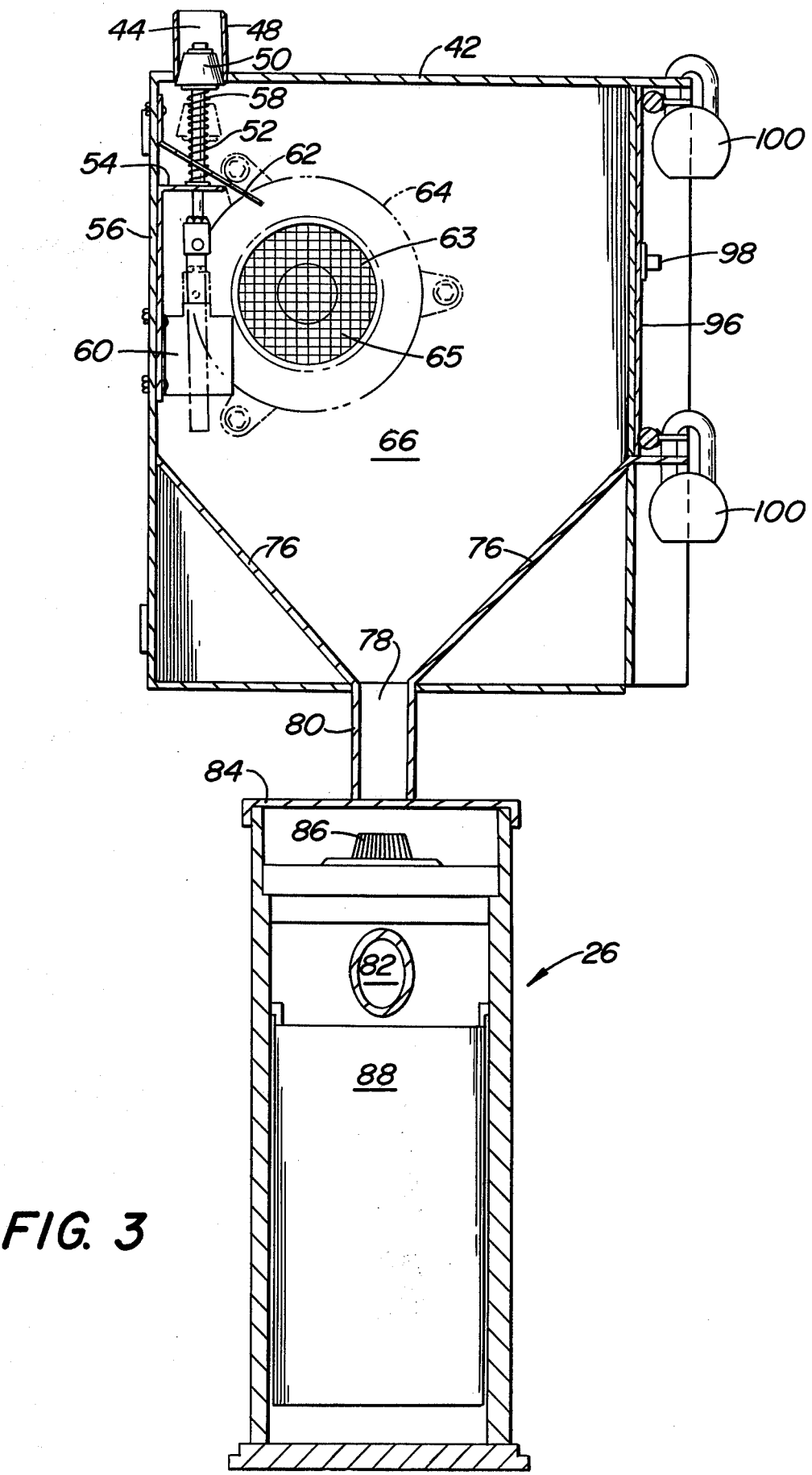
FIG. 3 is a cross-sectional view taken along lines 3—3 of FIG. 1.

The collection chamber 22 and the vault 26 may be placed in any convenient room and area of the car wash installation. As shown in FIGS. 1 and 2, the collection chamber 22 is attached to a vertical supporting wall 92. A plurality of flanges 90 extend from the collection chamber 22 and secure the collection chamber 22 to the wall 92 by means of bolts 94 passing through the flanges 90 into the wall 92. The collection chamber 22 has a front wall 96 with a handle 98 attached to the outer surface thereof. The front wall 96 is removable from the collection chamber 22 to permit access into the interior of the collection chamber 22. A pair of heavy duty security locks 100 secure the front wall 96 to the remainder of collection chamber 22. The collection chamber 22, the coin meters 24 and the vault 26 are each preferably constructed of heavy gauge steel.

Figure 4:
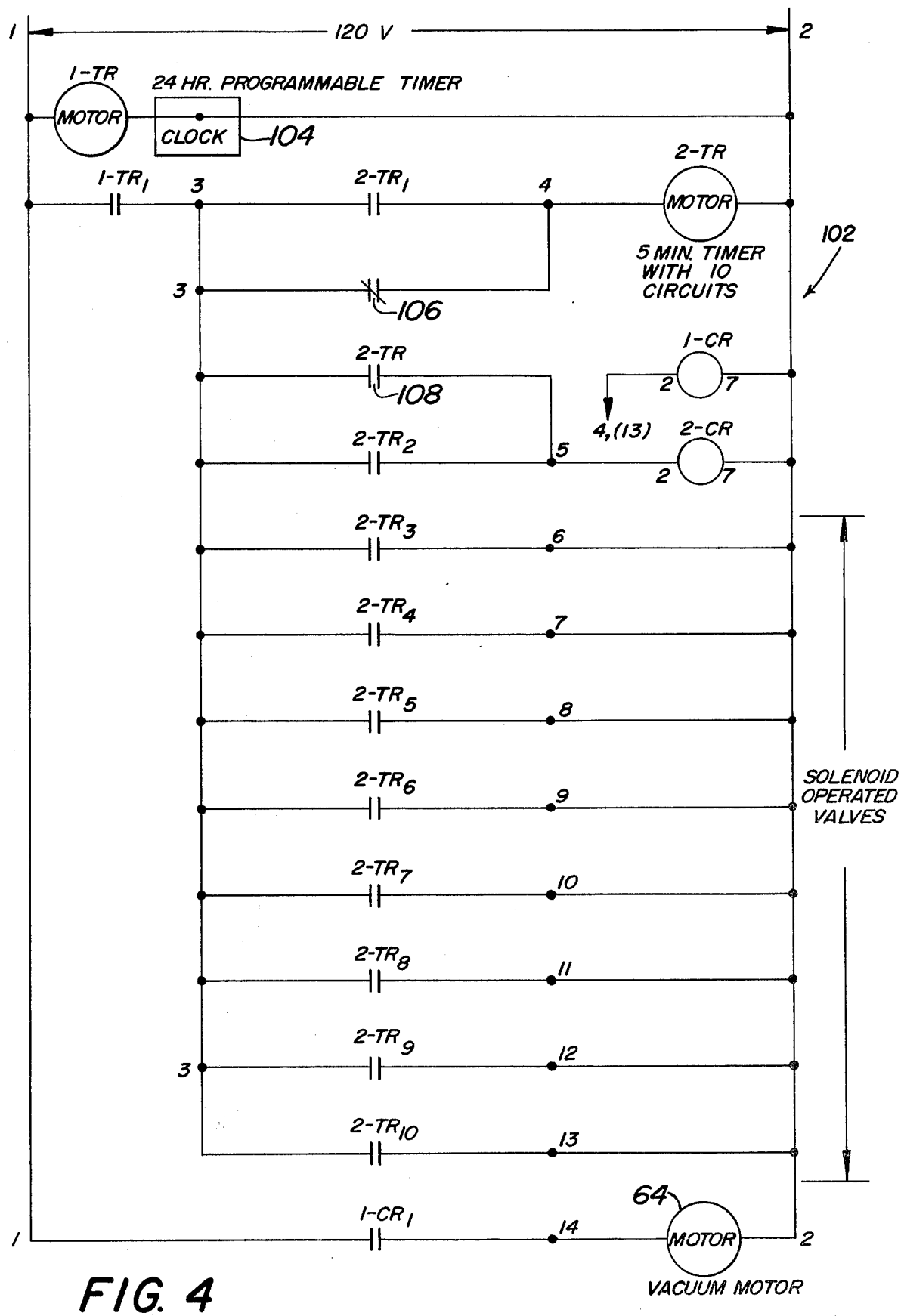
FIG. 4 is a circuit diagram illustrating the operation of the first and second timing mechanisms.

Many self-service car wash installations are unattended. In order that an undue amount of coins do not remain in any coin meter 24 for an extended length of time, an automatic mechanism is utilized to periodically activate the vacuum motor 64 and the solenoids 60. A suitable timing mechanism 102 is diagrammatically illustrated by the circuit diagram of FIG. 4. The timing mechanism 102 includes a twenty-four hour programmable motor driven timer 1-TR and a five minute motor driven timer 2-TR. Timer 1-TR is placed in a direct circuit with a clock 104. The timer 1-TR is programmed to close contacts 1-TR$_1$ at desired times over a twenty-four hour period. The timer 1-TR may be programmed to close contacts 1-TR$_1$ more frequently during estimated peak use periods or periodically at equal intervals, such as every four hours.

The 2-TR timer is a five minute motorized timer which can complete up to ten individual circuits by closing and opening relays 2-TR$_1$ to 2-TR$_{10}$ for any desired time interval during the five minute period. Each relay 2-TR$_1$ to 2-TR$_{10}$ is mechanically controlled by a cam driven by the motor of timer 2-TR. After timer 1-TR has closed contacts 1-TR$_1$, current is supplied to timer 2-TR by way of terminal 3, normally closed relay 106 and terminal 4. The contacts 1-TR$_1$ will remain closed for a time period longer than the five minute running period of timer 2-TR.

If eight coin meters 24 are connected to eight inlet holes 44 of a single collection chamber 22, coil 1-CR is connected to terminal 4. When coil 1-CR is activated, it closes coil relay 1-CR$_1$ to thus close the circuit to vacuum motor 64. With coil 1-CR connected to terminal 4, the vacuum motor will run through the entire cycle of timer 2-TR.

If seven or less coin meters 24 are connected to a single collection chamber 22, seven or less solenoids 60 and seven or less relays 2-TR$_3$ to 2-TR$_9$ are utilized. The coil 1-CR is therefore connected to terminal 13 and relay 2-TR$_{10}$. When coil 1-CR is connected to terminal 13, relay 2-TR$_{10}$ is set to close a few seconds after timer 2-TR is activated and to open a few seconds after the last solenoid 60 has been opened and closed.

As many as are required of relays 2-TR$_3$ to 2-TR$_{10}$ are each individually connected to a solenoid 60 at respective terminals 6-13. Relays 2-TR$_3$ to 2-TR$_{10}$ are set to sequentially open and close one after another. Relay 2-TR$_3$ will close shortly after the cycle of timer 2-TR begins. A solenoid 60 connected to terminal 6 is thus activated and the associated stopper 50 moves from its blocking position to allow communication between the collection chamber 22 and a coin meter 24 through a conduit 40. Relay 2-TR$_3$ remains closed for approximately 31.5 seconds. The 31.5 seconds is sufficient for the suction created by vacuum motor 64 to convey the coins from a coin meter 24 to the collection chamber 22. When relay 2-TR$_3$ opens, the solenoid 60 connected to terminal 6 is deactivated and the associated stopper 50 returns to its blocking position. Simultaneous with the opening of relay 2-TR$_3$, relay 2-TR$_4$ closes and the solenoid 60 connected to terminal 7 is activated to move the associated stopper 50 out of its blocking position.

This cycle is repeated for all of the solenoids 60 utilized in the collection chamber 22.

Relays 2-$TR_1$ and 2-$TR_2$ in conjunction with relays 106, 108 provide a reset circuit for the timer 2-TR. The relays 106, 108 are controlled by coil 2-CR. Relay 106 is normally closed and supplies current to timer 2-TR when the contacts 1-$TR_1$ are closed. The cycle of timer 2-TR is thus initiated. After approximately 15 seconds, relay 2-$TR_1$ is closed to provide a second current path to the timer 2-TR. Relay 2-$TR_1$ remains closed to the end of the 5 minute cycle of timer 2-TR. After approximately 30 seconds, relay 2-$TR_2$ closes and activates coil 2-CR. Coil 2-CR opens relay 106 and closes relay 108. Thus, after relay 2-$TR_2$ closes, current is supplied to the timer 2-TR only by way of relay 2-$TR_1$ and current is supplied to coil 2-CR by way of both relay 108 and relay 2-$TR_2$. Relay 2-$TR_2$ opens approximately 30 seconds before the end of the 5 minute cycle of timer 2-TR. Current, however, continues to be supplied to coil 2-CR by way of relay 108. In this manner, relay 106 remains open and current to timer 2-TR stops once the relay 2-$TR_1$ opens. Contacts 1-$TR_1$ open sometime after the cycle of timer 2-TR is completed and the current to coil 2-CR is stopped. Coil 2-CR is thus deactivated and relay 106 returns to its normally closed position to await initiation of a new cycle.

The operation of the coin collection apparatus should be self-evident from the above description. Coins are inserted into the various coin meters 24 by persons using the self-service car washing bays. Timer 1-TR is set to activate at various time intervals and in turn activates the 5 minute timer 2-TR. The timer 2-TR activates the vacuum motor 64 and sequentially activates the solenoids 60 so that one of the openings 44 at a time is open to the collection chamber 22. The coins drawn into collection chamber 22 thereafter fall by gravity into the vault 26. A large amount of coins are thus never present in the coin meters 24. A sign is installed on the coin meters 24 alerting a would-be thief to the fact that the coins are automatically and periodically removed from the meter 24. The temptation of theft or vandalism is thus reduced.

The present invention may be embodied in other specific forms without departing from the spirit or essential attributes thereof and, accordingly, reference should be made to the appended claims, rather than to the foregoing specification as indicating the scope of the invention.

What is claimed is:

1. A coin collection apparatus comprising:
   a collection chamber;
   a plurality of inlets to said collection chamber;
   each inlet being adapted to communicate with a separate and discrete source of coins;
   vacuum means for applying a vaccum to said chamber and for pneumatically conveying coins through said inlets into said collection chamber;
   blocking means for blocking each of said inlets;
   moving means for moving said blocking means from said blocking position to an open position; and
   a vault communicating with said collection chamber for receiving coins from said collection chamber.

2. A coin collection apparatus in accordnce with claim 1 wherein said collection chamber includes a plurality of interconnected walls, said vacuum means being attached to one of said walls and said inlets being formed as holes extending through another of said walls.

3. A coin collection apparatus in accordance with claim 2 wherein said blocking means includes a discrete stopper for blocking communication through each of said holes, each stopper being biased to a blocking position and said moving means moves each stopper individually against said bias and out of a blocking position to permit communication through said holes.

4. A coin collection apparatus in accordance with claim 3 wherein said moving means includes a separate solenoid for moving each of said stoppers.

5. A coin collection apparatus in accordance with claim 3 wherein said moving means includes a separate solenoid, each solenoid being attached to an interior surface of one of said walls, a rod movable by said solenoid, said stopper being carried for movement by said rod, and means for deflecting coins away from said solenoids after the coins enter said collection chamber through said holes.

6. A coin collection apparatus in accordance with claim 5 wherein said deflecting means includes a plate attached to the interior surface of the same wall as said solenoids, said plate extending in one direction downwardly and away from said interior surface past the outermost portion of said solenoids and said plate extending in another direction parallel to said interior surface to cover all of said solenoids, an each of said rods extending through a separate hole in said plate.

7. A coin collection apparatus in accordance with claim 6 including a second plate disposed between said solenoid and said stopper, said second plate extending generally in a plane transverse to the longitudinal axis of said rod, each of said rods extending through a hole in said second plate and a spring being disposed around each rod and between said stopper and the upper surface of said second plate to bias said rod in a blocking position.

8. A coin collection apparatus in accordance with claim 4 including a timing means for periodically activating said vacuum means and said solenoids.

9. A coin collection apparatus in accordance with claim 8 wherein said timing means includes a first timer operable over a twenty-four hour interval for periodically activating a second timer, and said second timer activating said vacuum mens and each of said solenoids.

10. A coin collection apparatus in accordance with claim 2 wherein said collection chamber includes a bottom slanted toward a discharge chute, said discharge chute communicating with said vault and said vault including a removable pouch for receiving coins from said discharge chute.

11. A coin collection apparatus comprising:
    a collection chamber having a plurality of walls;
    a vacuum means for applying a vacuum to said chamber attached to one of said walls;
    a plurality of inlet holes through a top wall of said chamber;
    connecting means for connecting each of said inlet holes to a separate and discrete source of coins;
    blocking means biased to a blocking position for individually blocking each of said inlet holes;
    moving means for moving said blocking means against said bias and out of said blocking position to allow communication between said chamber and said connecting means; and
    timing means for periodically activating said vacuum means and said moving means.

12. A coin collection apparatus in accordance with claim 11 wherein said blocking means includes a stopper for blocking each of said inlet holes and said moving means includes a solenoid for moving each stopper and a movable rod connects each stopper with a solenoid and a spring biases each stopper to a blocking position.

13. A coin collection apparatus in accordance with claim 12 wherein said timing means includes a first timer and a second timer, said first timer periodically activating said second timer, and said second timer including a plurality of relays for selectively activating said vacuum means and said solenoids, said second timer sequentially activating and deactivating said solenoids whereby only one of said inlet holes is open at a time.

14. A coin collection apparatus in accordance with claim 12 including a deflection plate disposed between said solenoids and said inlet holes for deflecting coins entering said chamber away from said solenoids and a second plate disposed between said solenoids and said inlet holes for supporting said biasing springs.

15. A coin collection system for use with self-service car wash equipment, comprising:
   a coin meter located at each of a plurality of car washing bays;
   a coin collection chamber for receving coins from each coin meter;
   vacuum means for applying a vacuum to said chamber;
   a plurality of inlet holes through a wall of said chamber;
   a conduit connecting each inlet hole with a coin meter;
   a discrete stopper for blocking each inlet hole;
   each stopper being biased by a spring to a blocking position wherein communication is blocked between said conduit and said chamber;
   a solenoid connected to each stopper for moving said stopper against said spring bias and out of said blocking position to allow communication between said conduit and said chamber;
   a first timer mechanism and a second timer mechanism;
   said first timer mechanism periodically activating said second timer mechanism;
   said second timer mechanism sequentially activating and deactivating said vacuum means and said solenoids whereby only one of said inlet holes is open at a time; and
   a vault disposed below and communicating with said chamber for storing coins collected in said chamber.

* * * * *